Feb. 6, 1940.                J. C. OLSEN                2,189,292
                             BELT FASTENER
                         Filed Dec. 12, 1938
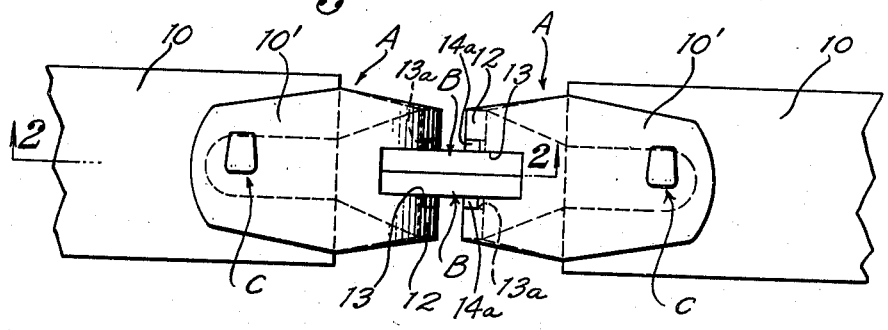
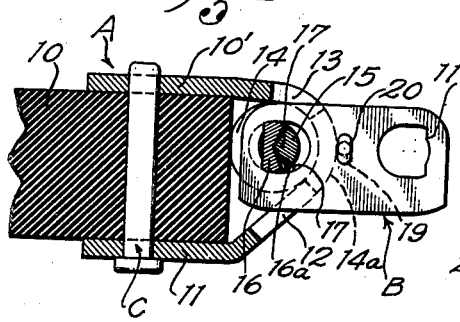   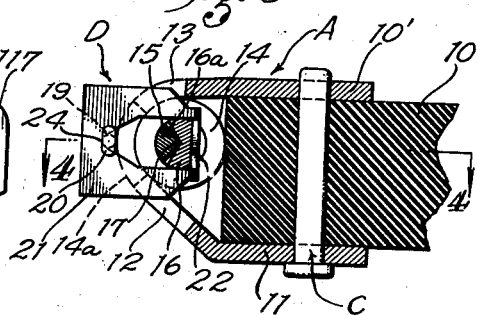
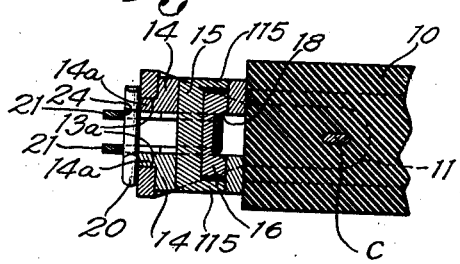   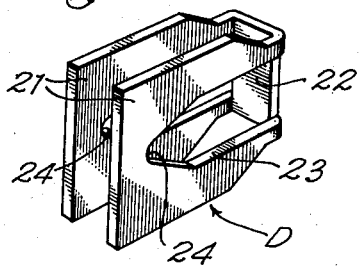
JOHN C. OLSEN,
INVENTOR.
BY Joseph Harris
ATTORNEY Patented Feb. 6, 1940

2,189,292

UNITED STATES PATENT OFFICE 2,189,292

BELT FASTENER

John C. Olsen, Chicago, Ill., assignor to Flexible Steel Lacing Company, Chicago, Ill., a corporation of Illinois Application December 12, 1938, Serial No. 245,180

5 Claims. (Cl. 24—33)

This invention relates to improvements in belt fasteners and more particularly, improved means for maintaining, during shipment and for application, the desired assembly of groups of elements constituting the flexible fasteners for V or side driving belts.

In certain types of flexible V-belt fasteners, for instance, such as shown in my prior Patent No. 1,989,147, of Jan. 29, 1935, the complete fastener comprises numerous elements, most of which are quite small and comparatively difficult to handle. These elements, especially the sectional rocker pins and bushings, must be carefully assembled in a particular manner in order that the fastener may function properly. In most instances, a completely assembled fastener, as such, cannot be attached to the two ends of a belt, but, on the contrary, one portion of the fastener is attached to one belt end, another portion to the other belt end, and then the two belt ends drawn together and the final link connection made between the two previously attached portions. Very frequently, such V-belt fasteners must be applied under adverse circumstances, as in the case of motor generator sets and air conditioning devices of railway cars and often by men who are not familiar with the details of assembly or even with a knowledge of all of the parts constituting such fasteners.

One object of this invention, therefore, is to provide improved means in flexible or hinged types of belt fasteners, by which the application thereof to the belt ends and proper assembly of the parts in working order, are greatly facilitated by workmen either familiar or unfamiliar with the details of construction of the fasteners.

Another object of the invention is to provide improved means in flexible or hinged types of V-belt fasteners by which the same may be shipped and, during shipment, maintained in certain assembled units without danger of loss or misplacement of any of the parts of the fastener and to the further end that the workmen, who may be called upon to apply the fasteners to belts, will readily perceive the proper method of attaching and assembling and be further assured that none of the parts is missing.

Other objects of the invention will more clearly appear from the description and claims hereinafter following.

In the drawing forming a part of this specification, Figure 1 is a top plan view of a complete V-belt fastener applied to the ends of a V-belt in accordance with the present invention. Figure 2 is a vertical sectional view corresponding to the section line 2—2 of Figure 1, illustrating a part only of the complete fastener attached to the corresponding belt end and illustrating also one of the assembled units, including the connector links proper of the complete belt fastener, as said unit is shipped and as it may be applied. Figure 3 is a view similar to Figure 2, illustrating, however, the remaining portions of the complete belt fastener as adapted to be shipped as a unit with a temporary dummy or semilink-like retaining element which temporarily, during shipment, replaces the connector links. Figure 4 is a horizontal, sectional view corresponding to the section line 4—4 of Figure 3. And Figure 5 is a detail perspective, upon an enlarged scale, of the temporary link-like retaining element employed in one of the units during shipment.

In said drawing, 10—10 indicate the ends of a V or side driving belt which are adapted to be connected by the complete flexible or hinged type of belt fastener. The complete belt fastener illustrated in the drawing comprises, broadly, two attaching members A—A; preferably a pair of link connectors B—B; securing pins or elements C—C; and means for pivotally connecting the ends of the link connectors B to the respective attaching members A, said means being hereinafter described more in detail.

Each of the attaching members A, as shown, comprises a plate of bail-like formation having an upper, relatively wide, longitudinally extending arm 10', a lower relatively narrow, longitudinally extending arm 11, and a rounded bight 12 connecting the arms 10' and 11. Each bight 12 is centrally apertured or slotted, as indicated at 13 to receive the link connectors B therethrough and permit the necessary angling or pivotal movement thereof in operation. Each attaching member A is preferably secured to the corresponding belt end by a pin or nail C extending through alined apertures in the arms 10' and 11 and through the belt material as shown.

Still referring to the complete belt fastener, the means for pivotally connecting the respective ends of the links B with the attaching members A may obviously vary in details, but preferably each said pivotal connecting means consists, as shown, of two laterally separated bearing bushings 14—14 and a two part rocker hinge pin 15—16, it being understood that the rocker hinge pins 15—16 extend through apertures 17 provided in the ends of the link connectors B.

Each bushing 14 has a central circular aperture to provide a bearing for an end of the rocker hinge pin 15—16, and is of generally cylindrical outer contour to seat within the rounded bight 12 of the attaching member. In addition, each bearing bushing 14 is preferably formed with a lip or flange 14a which is extended into the bight opening 13, as best shown in Figure 4, said flanges 14a being received in corresponding notches 13a in the sides of the slots 13 to thereby hold the bearing bushings in place and against turning, as will be understood.

The improved rocker hinge pin comprises the two sections 15 and 16, hereinbefore referred to. The hinge pin section 15 is of such length as to have its ends flush with the outer faces of the bearing bushings 14 when the parts are assembled and as shown in Figure 4. Said ends, referenced 115, are circular so as to completely occupy the bearing and thereby exclude or minimize entrance of dust or dirt into the bearings. Intermediate the ends 115, the rocker pin section 15 is of sector cross section, as indicated at 17, to cooperate with the other pin section 16 which is formed with a re-entrant V recess 16a of an included angle greater than the included angle of the sector section 17 to thereby provide a rocking knife edge. The pin section 16, as clearly shown in Figure 4, is of such length as to be received between the end flanges 115 of the pin section 15 and be restrained by the end flanges 115 against endwise displacement. Intermediate its ends and on the side adjacent the corresponding belt end, the pin section 16 is notched or recessed, as indicated at 18 to provide a flat bearing for the corresponding flat edge 117 of the link connector recesses and also to prevent relative lateral shift between the rocker hinge pin and the link connectors when all the parts are in assembled condition. As will be evident, when the link connectors B are seated within the hinge pin recesses 18 and held snugly in engagement therewith, the rocker hinge pins are thereby prevented against accidental lateral shift or displacement and, furthermore, the hinge pin sections 16 will rock in unison with the link connectors B relative to the other hinge pin sections 15.

In the preceding, the complete belt fastener in assembled operative condition has been described. During shipment, it is impracticable to ship the complete assembly as a single unit, and, furthermore, very rarely could a complete fastener be attached, as a complete unit, to the belt ends. In order, therefore, to ship the belt fastener in such condition that none of the parts may be lost or displaced, and further to facilitate the attachment to the belt end and lend guidance to the workmen applying the same as to the correct manner of assembling the parts, the following described means are employed. In this connection, it will be understood by those skilled in the art that some of the parts of the fastener, particularly for small size V-belts, are quite small and difficult to manipulate and easily lost if provision is not made for safe shipment. For instance, the total length of the rocker hinge pin for a ⅞" belt is only approximately ½" in actual practice and the length of the shorter section 16 of the hinge pin is of only approximately ⅜" with corresponding diameters.

In adapting the improved fastener for shipment and readier application, the same is shipped in two units. One unit comprises the assembly shown in Figure 2, that is, the attaching member A, the link connectors or elements B and the corresponding pivotal connecting means comprised of the two bushings 14 and rocker hinge pin sections 15 and 16. These parts of the unit are properly assembled at the factory and to maintain the same in assembled operative condition during shipment and also during application of this unit to the belt end, the link connectors B are transversely apertured as indicated at 19 at a point located closely adjacent the outer face of the rounded bight 12 when the parts are in operative position and there is temporarily employed during shipment and application of this unit, suitable retaining means such as a cotter pin 20. With this arrangement, as will be apparent, the parts are maintained in assembled operative condition, not only during shipment, but may be so retained during securing of the attaching member A to the belt end by the pin or nail C, whereupon the cotter 20 can then be removed, although this is not essential.

The other shippable unit of the belt fastener comprises the assembly shown in Figure 3, wherein is employed a temporary link-like retaining element D which takes the place of and functions like the connector links B in maintaining the assembly of the corresponding attaching plate A, bearing bushings and rocker hinge pin during shipment and application of the unit to the belt end.

Said assembly retaining element D may assume various forms such as a plate constituting slightly more than half of the length of the regular connector links B with a hole for reception of a cotter pin functioning in the same manner as the full length connectors B. Preferably, however, to reduce the cost of manufacture, since the retaining element D is to be thrown away, the latter is made in the form of a thin gage sheet metal stamping, as shown in Figures 3, 4 and 5. As shown, said element D is of generally U form, with side arms 21, 21, with a flat connecting section 22. The arms 21, 21 are laterally spaced to correspond with the normal spacing between the bushings 14—14, as shown in Figure 4 and preferably the material of which the element D is made will be of some inherent resiliency. The arms 21 of the element D are apertured or cut away, as indicated at 23, the apertures being of a width corresponding to the diameter of the rocker hinge pin 15, 16. Preferably, the recesses 23 are converged at their outer ends to an apex, as indicated at 24, which apices are likewise located so as to be closely adjacent the outer face of the rounded bight of the corresponding attaching member A. Said apices 24 are similarly adapted to receive a cotter pin or the like transversely therethrough as shown in Figures 3 and 4, and whereby the retaining element D is temporarily held in place and it, in turn, obviously will retain the corresponding bushings and rocker hinge pin in operative position as shown. In this connection, it will be seen that the flat connecting section 22 of the element D seats within the recess 18 of the corresponding rocker hinge pin.

The assembled unit shown in Figures 3 and 4 is shipped in the condition as shown in said figures. Said unit may also be applied to the belt end in the assembled condition shown. When, however, the two belt ends are to be finally connected, obviously the retaining element D must be removed which is done by first removing the corresponding cotter pin 20, then pushing the retaining element D inwardly so as to clear the shoulders of the rocker hinge pin section 16, then withdrawing the rocker hinge pin and finally withdrawing the element D and discarding the latter if so desired. The final assembly of the complete fastener is then made by drawing up the two belt ends, one with the assembly as shown in Figure 2, but with the cotter pin 20 thereof removed, then inserting the free ends of the connector links B through the aperture of the right hand attaching member A shown in Figure 3, next inserting the rocker hinge pin which has been previously removed and engaging the connector links B with the finally inserted rocker hinge pin and releasing the belt ends so as to render the entire connection taut.

As will be apparent from the preceding description, the improvements eliminate practically all danger of loss or displacement of any of the parts of the improved fastener during shipment, and furthermore greatly facilitate and speed up the application of the fastener to a belt, the latter factor being particularly important where the fasteners must be applied under adverse conditions in cramped quarters and frequently in inclement weather, as in the case of railway car appliances.

Although there has herein been shown and described what is now considered the preferred manner of carrying out the invention, all changes and modifications are contemplated that come within the scope of the claims appended hereto.

What is claimed is:

1. As an article of manufacture for shipment and application as a unit to a belt end to constitute part of a complete V-belt fastener, the combination with an attaching member of bail-like formation having an apertured bight; of a link connector extending through the aperture of the bight; means providing a detachable pivotal connection between the end of said link connector located within the bight and said attaching member, said means including a hinge pin having shouldered engagement with the corresponding adjacent end of the link connector, said link connector being transversely apertured at a point located immediately adjacent the outer face of the bight when the link connector and pivotal connecting means are in operative position relative to the attaching member; and a temporary retaining device extended transversely through said aperture of the link connector, said device engaging the outer face of the bight to thereby maintain said operative assembled position of the link connector, attaching member and pivotal connecting means during shipment and application of the unit to a belt end.

2. As an article of manufacture for shipment as a unit and for attachment to a belt end to constitute part of a complete V-belt fastener, the combination with a bail-like attaching member having an apertured bight; of an element extending through the aperture of the bight; means providing a detachable pivotal connection between said element and the attaching member within the bight, said means including a pin having shouldered engagement with said element; and means on, and readily removable from, said element on the outer side of the bight and engageable with the latter when said element is in shouldered engagement with said pin and the latter in operative position relative to the attaching member whereby to maintain the assembly of the attaching member, element and pivotal connecting means during shipment and application of the unit to a belt end.

3. In a device of the character described, the combination with an attaching member adapted to be secured to a V-belt end, said attaching member having upper and lower longitudinally extending arms and an apertured connecting rounded end bight; of a link-like element extending through the apertured bight; means adapted to provide a detachable pivotal connection between said attaching member and said link-like element, said means including bearing elements seated against and within said rounded end bight and having portions extending into said aperture thereof, and a transversely extending hinge pin journaled in said bearing elements and having an intermediate shouldered portion with which the inner end of said link-like element is engaged; and transversely insertable and removable means on said link-like element engageable with the outer face of the rounded bight when said pivotal connecting means are in operative position within the rounded bight thereby to maintain the shouldered engagement of said link-like element and pin to thereby retain the parts in assembled condition.

4. A device in accordance with claim 2 wherein said last named means comprises a detachable pin extending transversely through said link-like element.

5. As an article of manufacture, an element for retaining an attaching member and pivotal connecting means including a rocker hinge pin in assembled condition during shipment, said element comprising a plate of generally U formation with the connecting section thereof flat, the arms of the U section being transversely apertured adjacent said flat connecting section for the reception of the rocker pin therethrough, said arms being also apertured adjacent the free ends of the arms of the U to provide an opening for the reception of a transversely extending pin-like device located at a predetermined distance from said flat connecting section such as to maintain the rocker hinge pin in operative position within the attaching member when said element, attaching member and pivotal connecting means are assembled.

JOHN C. OLSEN.